United States Patent
Garvin

(12) 
(10) Patent No.: US 6,364,266 B1
(45) Date of Patent: Apr. 2, 2002

(54) UNIVERSAL ELECTRICAL WIRE HANGER

(76) Inventor: Barton L. Garvin, 1300 Highridge Pkwy., Westchester, IL (US) 60154

( * ) Notice: Subject to any disclaimer, the term of this patent is extended or adjusted under 35 U.S.C. 154(b) by 0 days.

(21) Appl. No.: 09/543,003

(22) Filed: Apr. 4, 2000

(51) Int. Cl.⁷ .................................................. A47H 1/16
(52) U.S. Cl. ...................................................... 248/303
(58) Field of Search ................................ 248/302, 303, 248/304, 339, 58

(56) References Cited

U.S. PATENT DOCUMENTS

| | | | | |
|---|---|---|---|---|
| 1,196,755 A | * | 9/1916 | Bartine | 248/302 |
| 1,225,585 A | * | 5/1917 | Cosner | 248/303 |
| 2,603,438 A | * | 7/1952 | Adams | 248/302 X |
| 5,232,189 A | * | 8/1993 | Koch | 248/309.1 |

* cited by examiner

Primary Examiner—Ramon O. Ramirez
(74) Attorney, Agent, or Firm—Charles F. Meroni, Jr.; Meroni & Meroni, P.C.

(57) ABSTRACT

This invention concerns a one piece device which is directly mounted by an installation gun to support electrical wires to a flat surface such as a ceiling or a wall. The device comprises a mounting portion, a distancing portion, a receiving portion, and a fastening portion. The mounting portion has a looped terminal which is positioned flush against the surface. The distancing portion is perpendicularly joined to the mounting portion and extends away from the surface to define a clearance distance. The receiving portion is joined to the distancing portion and comprises a looped wire receiving portion for receiving and supporting an electrical wire. The fastening portion is attached to the looped terminal for fastening to the surface.

24 Claims, 2 Drawing Sheets

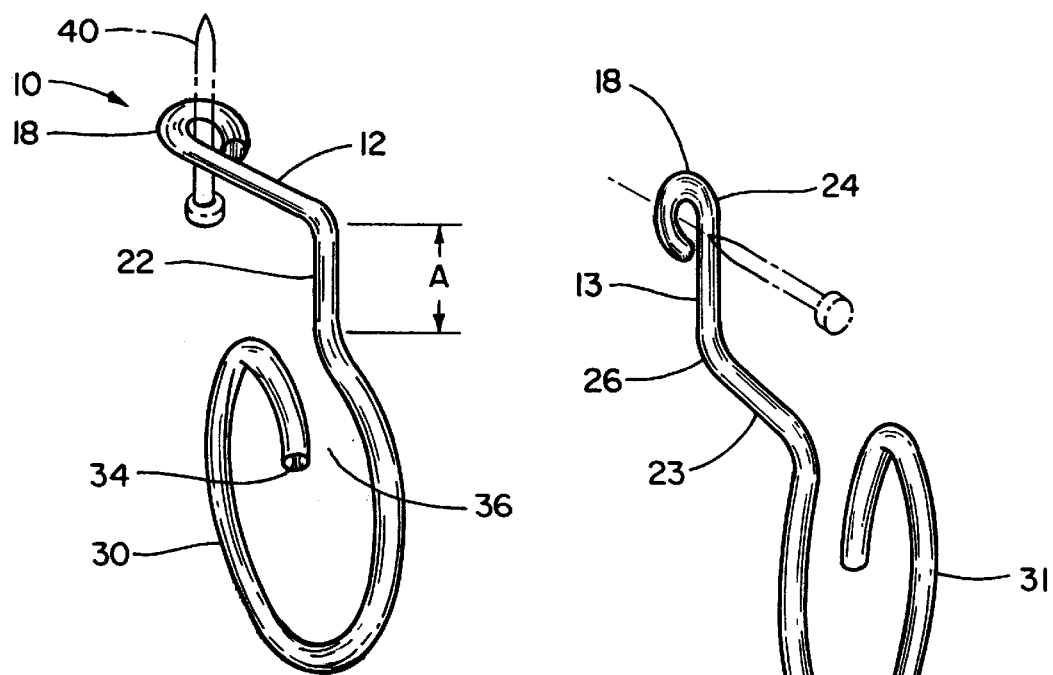
Fig. 1
Fig. 2
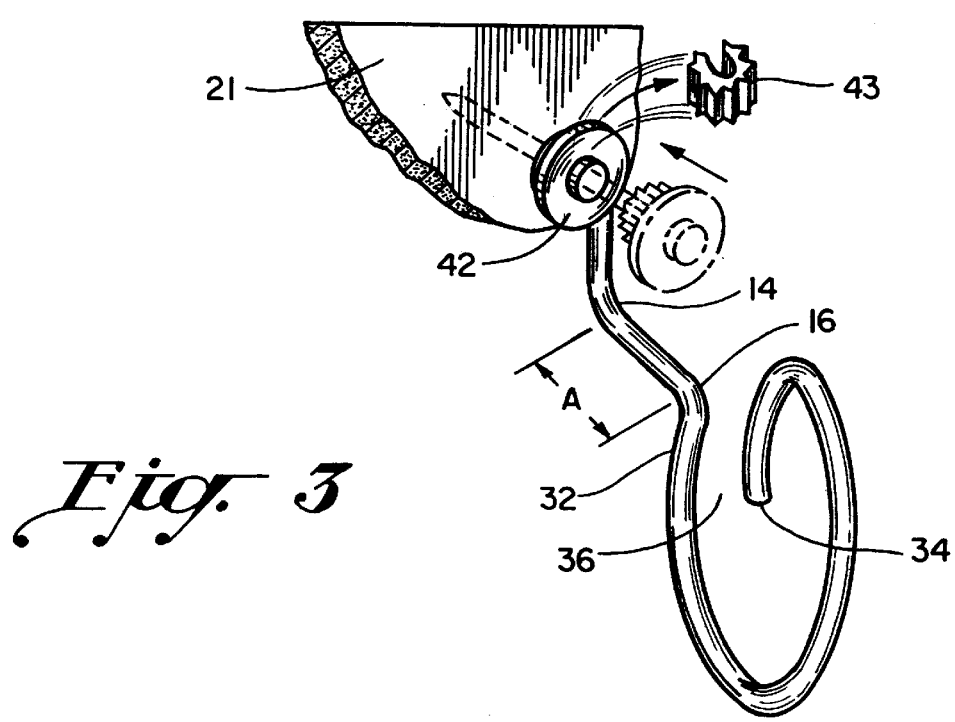
Fig. 3

UNIVERSAL ELECTRICAL WIRE HANGER

BACKGROUND OF THE INVENTION

1. Field of the Invention

The present invention relates to a mechanical device to support electrical wires and cables from a flat surface such as a ceiling or a wall. More specifically, my invention is primarily intended to provide an installer such as an electrical contractor a one piece universal wire hanger to directly mount to all surfaces by firing from a powder actuated installation gun commonly used in the industry in one convenient, efficient and economical step. The present invention can be utilized to support wires, such as, but not limited to, electrical and telecommunications wire. The present invention can also be utilized to support tubing, channel and the like. The present invention can be comprised of a multitude of materials including but not limited to galvanized metal.

2. Description of the Prior Art

In the electrical industry, open loop shaped wire hangers for overhead use are commonly referred to as "bridle rings". These bridle rings are a wire formed product comprising a loop with a threaded leg extending out of the loop. The loop supports the wire while the threaded leg is installed into the mounting surface such as a ceiling or a wall. As the industry practice utilizes a threaded leg, the bridle ring must be fastened to numerous installation accessories to properly mount it to the surface. In particular, to mount a bridle ring, a rod anchor pin and a rod coupler must be utilized along with a surface hole or insert.

Because of these numerous installation accessories used in the current state of the art, mounting a bridle ring to support wires requires very labor intensive and costly steps to install. First, the installer must drill a hole or insert into the mounting surface such as the ceiling or the wall. Next, the installer must install a rod anchor containing a female thread into the hole. Then the installer must thread a rod coupler into the anchor pin to provide a mount for the bridle ring. Next, the in staller threads the bridle ring into the rod coupler. After, installation, the installer must retrieve the wire from a wire puller located at a distance away from the bridle ring. The installer then must proceed to carry the wire to the bridle ring and insert it through the installed bridle ring.

As in many electrical jobs, these bridle rings are installed at a height requiring a ladder or a scaffold. Thus, this multi step process is further encumbered by having to descend and ascend the ladder/scaffold to install the accessories and to install the bridle ring. After installation, the installer must descend from the location to retrieve and pull the wire for each needed location of the bridle ring and pull the wire back up the ladder/scaffold through the bridle ring.

In the present state of the art, a hanger does not exist to economically and efficiently support electrical wire in a one step installation while allowing an installer to repetitively install hangers without stopping to insert accessories or pull wire. Currently, loop shaped supports exist for supporting or hanging tubular members such as a wire. In particular, U.S. Pat. No. 5,022,614 issued to Rindeerer discloses a one piece conduit clip for securing conduit and the like to channel framing. The channel framing is commonly used in the industry and contains hook shaped lips at the ends of outer sides of the channel. These lips define a slot extending lengthwise of the channel. The slot opens downwardly when the channel is mounted in a ceiling and opens laterally when the channel is mounted on a side wall.

The clip comprises a one piece U-shaped clip with planar legs extending down away from the U-shaped opening with a connecting portion connecting the legs to each other. The U-shaped opening contains feet at each side which overlap inside the channel to slot inside the channel ridge holding the clip by pressure force to the channel member. Electrical cable is then slotted through the clip to be held at the desired height of the channel.

As with the existing bridle rings, limitations exist with respect to the conduit clip. Although the clip is a one piece member which can be installed in a convenient succession, the clip cannot be directly installed to a surface to a surface such as a ceiling or wall. The clip can only be installed to channel which requires mounting to the surface. Mounting the channel requires labor intensive steps to properly prepare the surface insert and fasten the channel at numerous locations along the surface. Further, the clip has to be mounted individually to the channel. Thus, numerous costly steps are required to mount the clip to the channel.

U.S. Pat. No. 3,995,822 issued to Einhorn discloses a swivel hook with pivotable components. The swivel hook comprises a yoke with a hook pivotally mounted to the yoke. The yoke is a U-shaped member joined by a bridge extending across which mounts to a surface. In an alternative embodiment, the yoke contains a mounting hole defined therein where a screw can be inserted for mounting the swivel hook directly to a surface. Still, further, in another embodiment, a screw is affixed to the back portion of the yoke which can be directly screwed into a mounting surface.

This swivel hook also contains limitations though. Because the hook is positioned directly opposite of the yoke, an installer cannot load the swivel hook into a powder actuated installation gun commonly used in the construction industry. Powder actuated installation guns fire a pin, nail or rod into a mounting surface in rapid succession as opposed to an installer either hammering or screwing the individual fastener into the mounting surface. As the hook is located directly opposite of the yoke and corresponding mounting screw, the swivel hook cannot be physically loaded into a powder actuated installation gun as the gun is configured to fire a tubular member such as a drive pin or nail. Thus, an installer must individually screw the swivel hook into the mounting surface resulting in labor extensive steps.

It would become highly economical to eliminate the extensive time, labor and material currently needed to mount bridle rings commonly used in the electrical industry. This cumbersome and inefficient method would be eliminated by a quick succession of movements.

It would become highly advantageous to provide a device that can efficiently, quickly and economically support electrical wires by directly mounting to a mounting surface. It further becomes highly advantageous to directly mount the device by using a powder actuated installation gun.

Accordingly, it is a principal object of my invention to provide a universal wire hanger to directly mount to a surface such as a ceiling and a wall.

It is still further an object of my invention to provide a universal wire hanger that is configured to be fired from a powder actuated installation gun.

Other objects of my invention, as well as particular features, elements, and advantages thereof, will be elucidated in, or apparent from, the following description and the accompanying drawing figures.

SUMMARY OF THE INVENTION

According to my present invention I have provided an universal electrical wire hanging device for hanging an electrical wire in a position for use when attaching to a surface comprising a mounting means, a distancing means, a receiving means and a fastening means for mounting a mounting member formed of an elongated rigid piece of wire to a surface such as a ceiling or a wall. The mounting means comprises an upper leg having a first end and a second end where a looped terminal is planarly joined at the first end. The looped terminal is positioned flush underneath the surface for attaching the upper leg to the surface.

The distancing means connects about a right angular relation to the mounting means wherein the distancing means extends away from the surface for distancing the mounting means from the surface. The distancing means comprises an upright leg having an upper end and a lower end where the upper end is joined relatively perpendicular to the second end of the upper leg.

The receiving means is joined to the distancing means for receiving and supporting at least one electrical wire. The receiving means comprises a looped wire receiving portion which is serpentinely joined to the lower end of the upright leg. The loop wire receiving portion is joined to the lower end by a terminal end where the terminal end is spaced in relation to an opposite end of the looped wire receiving portion. This space leaves a gap of sufficient width for receiving an electrical wire for supporting engagement by the looped wire receiving portion.

The fastening means is joined to the mounting means for fastening the mounting member to the surface. The fastening means comprises a fastener weldably attached underneath to the looped terminal end for fastening the looped terminal end to the ceiling surface. The fastener comprises a driving pin where the driving pin mounted through a plate welded to the bottom of the looped terminal.

DESCRIPTION OF THE DRAWINGS

Other features of my invention will become more evident from a consideration of the following detailed description of my patent drawings, as follows:

FIG. 1 is a perspective view of the first embodiment for a hanging electrical wire from a horizontal surface such as a ceiling showing the upper leg, the S-shaped upright leg and the looped wire receiving portion;

FIG. 2 is a perspective view of the second embodiment for hanging electrical wire from a vertical surface such as a wall showing the side leg, the extension leg, and the looped wire receiving leg;

FIG. 3 is a perspective view of the second embodiment of FIG. 2 showing the fastener, comprised of a driving pin and a circular plate, fastening the universal wire hanger to a wall surface and also showing the loading member being split apart and falling away;

DETAILED DESCRIPTION OF THE PREFERRED EMBODIMENT

Figure 4:
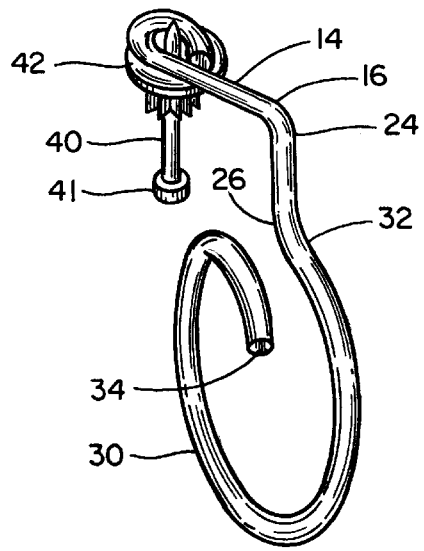
FIG. 4 is a view of the first embodiment of FIG. 1 showing the fastener weldably attached underneath to the looped terminal.
Figure 5:
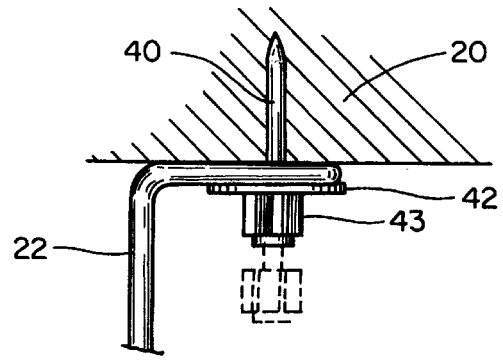
FIG. 5 is a view of the first embodiment showing the fastener fastening the looped terminal and the upper leg to a horizontal surface such as a ceiling.

Referring now to the drawings, a preferred embodiment of the invention, generally indicated by 10 as shown in FIG. 1, supports electrical wires and the like directly to a surface. The wires can be supported from a horizontal surface such as a ceiling surface 20 as shown in FIG. 5 and from a vertical surface such as a wall surface 21 as shown in FIG. 3. The wire hanger can be further supported from an angled surface or a bottom surface. Key features of one preferred embodiment of my invention, as shown in FIGS. 1, 2, 3 & 4 are an upper leg 12, a looped terminal 18, an S-shaped upright leg 22, a loop receiving portion 30 and a fastener 38.

Figure 6:
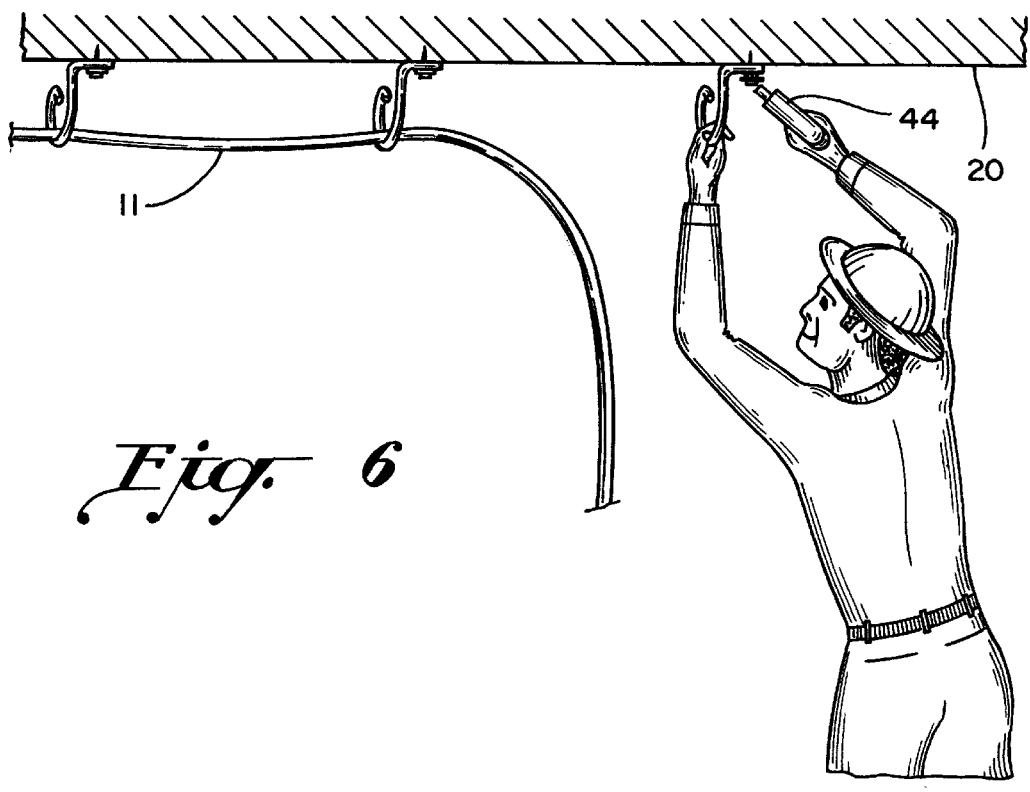
FIG. 6 is a view showing an installer mounting the looped terminal to the a ceiling using a powder actuated installation gun.

As shown in FIG. 1, excellent results are obtained when a universal electrical wire hanger 10 is configured in a one piece construction to attach to a horizontal surface. This configuration can be made from a multitude of material, such as, but not limited to, galvanized wire. By eliminating numerous installation accessories, excessive and costly labor steps are avoided in a one piece configuration. This one piece configuration can be utilized to support wires and tubing, such as, but not limited, to electrical and telecommunications wires as shown in FIG. 6.

The universal wire hanger 10 comprises a mounting means preferably comprised of a mounting portion shown as an upper leg 12 in FIG. 1. The upper leg 12 has a first end 14 and a second end 16 where the first end 14 and the second end 16 are located opposite of each other. A looped terminal 18, which is planarly joined at the first end 14, is positioned flush underneath the ceiling surface 20 as shown in FIG. 5. The looped terminal 18 is positioned co-planarly against the ceiling surface 20 to attach the terminal end 18 to the ceiling surface 20. Excellent results are obtained when the terminal end 18 contains an inner diameter not exceeding 0.265 inches. The inner diameter locates a space for a driving pin 40, hereinafter discussed, to fasten the looped terminal 18 to the surface.

As shown in FIG. 1, 4& 5, a distancing means comprising of an intermediate portion preferably shown as a generally S-shaped upright leg 22 is utilized to clear the electrical wire 11 from the surface such as the ceiling surface 20. The S-shaped upright leg 22 comprises an upper end 24 and a lower end 26 where the upper end 24 is joined relatively perpendicular to the second end 16 of the upper leg 12. The S-shaped upright leg 22 is joined perpendicularly to the upper leg 12 to extend away from the second end 16 to define a clearance distance A as shown in FIG. 1 from the surface. The clearance distance A provides the necessary work space to efficiently pull the electrical wire 11 while receiving and supporting the electrical wire 11 at the desired elevation as shown in FIG. 6. Thus, the clearance distance prevents any hindrance and blockage with the mounting surface while pulling the electrical wire 11. Therefore, the clearance distance provides a more efficient manner of supporting the electrical wire 11. When the surface is a ceiling surface 20, the S-shaped upright leg 22 downwardly extends away from the second end 16. The surface can further be angled or a can be a bottom surface where the S-shaped upright leg 22 extends perpendicularly away from the surface to define the clearance distance.

At the lower end 26 of the S-shaped upright leg 22, a receiving means preferably comprised of a looped wire receiving portion 30 is joined. The looped wire receiving portion 30 is joined to the lower end 26 by a terminal end 32 of the loop wire receiving portion 30. The terminal end 32 is configured in a spaced relation to an opposite end 34 of the looped wire receiving portion 30 as shown in FIG. 4. This spacing leaves a gap 36 of sufficient width for receiving an electrical wire 11. Thus, the installer inserts the electrical wire 11 into the gap 36 where the loop wire receiving portion 30 supports the electrical wire 11 at the clearance distance A away from the surface. Excellent results are obtained when the loop wire receiving portion 30 contains a diameter not exceeding four inches in order to support a plurality of electrical wires.

A fastening means can also be utilized to fasten the looped terminal 18 to the surface. The fastening means preferably comprising of a fastener 38 shown as a driving pin 40 and a circular plate 42 can be welded to the looped terminal 18 as shown in FIG. 4. Prior to the welding, the driving pin 40 is forced partially through the circular plate 42. Between the top end 41 of the driving pin 40 and the circular plate 42, a loading member 43 is inserted as shown in FIGS. 3 & 4. The loading member 43 is typically a ridged rubber like material which is configured to a powder actuated installation gun 44. Powder actuated installation guns 44 are commonly used in the construction industry to fire fasteners into surfaces such as ceilings and walls.

Thus, the installer loads the fastener 38 with loading member 43 attached into the powder actuated installation gun 44 and fires the driving pin 40 through the looped terminal 18 and into the ceiling surface 20 as shown in FIG. 5. The resulting force breaks the loading member 43 free which falls to the ground as shown in FIG. 3. The top end 41 is stopped by the circular plate 42 which does not move as the circular plate 42 is welded to the looped terminal 18 opposite of the ceiling surface 20. Thus, the installer can efficiently mount the universal wire hanger 10 in one easy step by loading the driving pin 40 into and firing from the powder actuated installation gun 44. The installer can also mount the universal wire hanger 10 without the fastener 38. In this installation, the installer loads only a driving pin 40 into the installation gun 44 and fires the driving pin 40 directly through the looped terminal 18 and into the surface.

In another preferred embodiment, as shown in FIG. 2, excellent results are obtained when a universal electrical wire hanger 10 is configured in a one piece construction to attach to a vertical surface such as a wall surface 21.

The universal wire hanger 10 comprises a mounting means preferably comprised of a side leg 13 as shown in FIG. 2. The side leg 13 has a upper end 24 and a lower end 26 where the upper end 24 and the lower end 26 are located opposite of each other. A looped terminal 18 is adjacently positioned to the wall surface 21 as shown in FIG. 3. The looped terminal 18 is positioned co-planarly against the wall surface 21 to attach the terminal end 18 to the wall surface 21. Excellent results are obtained when the terminal end 18 contains an inner diameter not exceeding 0.265 inches. The inner diameter locates a space for a driving pin 40 to fasten the looped terminal 18 to the surface.

As shown in FIG. 2 & 3, a distancing means comprising of preferably shown as a generally extension leg 23 is utilized to clear the electrical wire 11 from the surface such as the wall surface 21. The extension leg 23 comprises a first end 14 and a second end 16 where the first end 14 is joined relatively perpendicular to the lower end 26 of the side leg 13. The extension leg 23 is joined perpendicularly to the side leg 13 to extend away from the lower end 26 to define a clearance distance A as shown in FIG. 2 from the surface. The clearance distance A provides the necessary work space to efficiently pull the electrical wire 11 while receiving and supporting the electrical wire 11 at the desired elevation as shown in FIG. 6. Thus, the clearance distance prevents any hindrance and blockage with the mounting surface while pulling the electrical wire 11. Therefore, the clearance distance provides a more efficient manner of supporting the electrical wire 11. When the surface is a wall surface 21, the extension leg 23 outwardly extends away from the lower end 26 as shown in FIG. 3.

At the second end 16 of the extension leg 23, a receiving means preferably comprised of a looped wire receiving leg 31 is joined. The looped wire receiving leg 31 is joined to the second end 16 by a terminal end 32 of the loop wire receiving leg 31. The terminal end 32 is configured in a spaced relation to an opposite end 34 of the looped wire receiving leg 31 as shown in FIG. 2. This spacing leaves a gap 36 of sufficient width for receiving an electrical wire 11. Thus, the installer inserts the electrical wire 11 into the gap 36 where the loop wire receiving leg 31 supports the electrical wire 11 at the clearance distance A away from the surface. Excellent results are obtained when the loop wire receiving leg 31 contains a diameter not exceeding four inches in order to support a plurality of electrical wires.

A fastening means can also be utilized to fasten the looped terminal 18 to the wall surface 21. The fastening means preferably comprising of a fastener 38 shown as a driving pin 40 and a circular plate 42 can be welded to the looped terminal as shown in FIG. 3. The installation is the same procedure using the powder actuated installation gun 44 to install to the wall surface 21 as to install to the ceiling surface 20 previously discussed.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. A universal electrical wire hanger for holding an electrical wire in a position for use when attaching to a ceiling surface comprising:

an upper leg, the upper leg having a first end and a second end where a looped terminal is planarly joined at the first end, the looped terminal positioned flush underneath a ceiling surface for attaching the upper leg to the ceiling surface, the looped terminal having an inner diameter not exceeding 0.265 inches;

a generally S-shaped upright leg, the S-shaped upright leg having an upper end and a lower end, the upper end being joined relatively perpendicular to the second end of the upper leg, the S-shaped upright leg downwardly extending away from the second end to define a clearance distance from the ceiling surface;

a looped wire receiving portion, the looped wire receiving portion joined to the lower end of the S-shaped upright leg, the loop wire receiving portion joined to the lower end by a terminal end, the terminal end configured in a spaced relation to an opposite end of the looped wire receiving portion leaving a gap of sufficient width for receiving an electrical wire for supporting engagement by the looped wire receiving portion, the looped wire receiving portion having a diameter, the diameter not exceeding four inches for supporting an electrical wire for use beyond the clearance distance from the ceiling surface; and a fastener, the fastener weldably attached underneath to the looped terminal for fastening the looped terminal to the ceiling surface.

2. The electrical wire hanger of claim 1, wherein the fastener comprises a driving pin, the driving pin mounted through a circular plate welded to the looped terminal.

3. A universal electrical wire hanger for holding electrical wire in a position for use when attaching to a horizontal surface comprising:

a mounting portion, the mounting portion having a circular mounting end, the circular mounting end co-planarly positioned against a horizontal surface for mounting to the horizontal surface;

an intermediate portion, the intermediate portion perpendicularly connected to the mounting portion and extending away from the horizontal surface to define a clearance distance from the horizontal surface; and a looped receiving portion, the loop receiving portion connected to the intermediate portion in an opposite direction from the mounting portion, the looped receiving portion having a terminal end, the terminal end spaced in relation to an opposite end leaving a gap of sufficient width for receiving at least one electrical wire, the loop receiving portion being configured for supporting at least one electrical wire away from the horizontal surface by the clearance distance.

4. The universal electrical wire hanger of claim 3, further comprising a fastener, the fastener attached underneath to the circular mounting end for fastening the circular mounting end to the horizontal surface.

5. The universal electrical wire hanger of claim 3, wherein the looped receiving portion has a diameter, the diameter not exceeding four inches for supporting at least one electrical wire beyond the clearance distance from the horizontal surface.

6. A universal electrical wire hanging device for hanging an electrical wire in a position for use when attaching to a surface comprising:

mounting means for mounting a mounting member formed of an elongated rigid piece of wire to a surface;

distancing means connected about a right angular relation to the mounting means, the distancing means extending away from the surface for distancing the mounting means from the surface;

receiving means joined to the distancing means for receiving and supporting at least one electrical wire; and fastening means joined to the mounting means for fastening the mounting member to the surface, wherein the receiving means comprises a looped wire receiving portion, the loop wired receiving portion being joined to distancing means so as to form a discontinuous planar circle, said discontinuity in said planar circle leaving a gap of sufficient width for receiving an electrical wire for supporting engagement by the looped wire receiving portion.

7. The universal electrical wire hanging device of claim 6, wherein the mounting means comprises an upper leg having a first end and a second end where a looped terminal is planarly joined at the first end, the looped terminal positioned flush underneath the surface for attaching the upper leg to the surface, the looped terminal having an inner diameter, the inner diameter not exceeding 0.265 inches for defining the mounting member therein for the fastening means.

8. The universal electrical wire hanging device of claim 7, wherein the distancing means comprises an upright leg, the upright leg having an upper end and a lower end, the upper end joined relatively perpendicular to the second end of the upper leg, the upright leg extending away from the second end to define a clearance distance from the surface.

9. The universal electrical wire hanging device of claim 8, wherein the receiving means comprises a looped wire receiving portion, the loop wired receiving portion is serpentinely joined to the lower end of the upright leg, the loop wire receiving portion being joined to the lower end by a terminal end, the terminal end spaced in relation to an opposite end of the looped wire receiving portion leaving a gap of sufficient width for receiving an electrical wire for supporting engagement by the looped wire receiving portion, the looped wire receiving portion having a diameter, the diameter not exceeding four inches for supporting at least one electrical wire beyond the clearance distance from the surface.

10. The universal electrical wire hanging device of claim 9, wherein the fastening means comprises a fastener, the fastener weldably attached underneath to the looped terminal for fastening the looped terminal end to the ceiling surface, the fastener comprising of a driving pin, the driving pin mounted through a plate welded to the bottom of the looped terminal.

11. A universal electrical wire hanger for holding an electrical wire in a position for use when attaching to a wall surface comprising:

a side leg, the side leg having a upper end and a lower end planarly located opposite of each other, the lower end being positioned below the upper end, the upper end having a looped terminal, the looped terminal is adjacently positioned to a wall surface for attaching the side leg to the wall surface, the looped terminal having an inner diameter not exceeding 0.265 inches;

an extension leg, the extension leg having an first end and a second end planarly located opposite of each other, the first end being joined relatively perpendicular to the lower end of the side leg, the extension leg outwardly extending away from the lower end to define a clearance distance from the wall surface;

a looped wire receiving leg, the looped wire receiving leg joined to the second end of the extension leg, the loop wire receiving leg joined to the second end by a terminal end, the terminal end configured so as to form a discontinuous planar circle, said discontinuity in said planar circle leaving a gap of sufficient width for receiving an electrical wire for supporting engagement by the looped wire receiving leg, the looped wire receiving leg having a diameter, the diameter not exceeding four inches for supporting an electrical wire for use beyond the clearance distance from the wall surface; and a fastener, the fastener weldably attached to the side of the looped terminal for fastening the looped terminal to the wall surface.

12. The universal wire hanger of claim 11, wherein each leg is formed of an elongated piece of wire for supporting the electrical wire.

13. The electrical wire hanger of claim 11, wherein the fastener comprises a driving pin, the driving pin being mounted through a circular plate welded to the looped terminal.

14. A universal electrical wire hanging device for hanging an electrical wire in a position for use when attaching to a vertical surface comprising:

mounting means for mounting a mounting member to a vertical surface; distancing means connected about a right angular relation to the mounting means, the distancing means extending away from the vertical surface for distancing the mounting means from the vertical surface;

receiving means joined to the distancing means for receiving and supporting at least one electrical wire; wherein the receiving means comprises a looped wire receiving portion, the loop wired receiving portion being joined to distancing means so as to form a discontinuous planar circle, said discontinuity in said planar circle leaving a gap of sufficient width for receiving an electrical wire for supporting engagement by the looped wire receiving portion, and fastening means joined to the mounting means for fastening the mounting member to the vertical surface.

15. The universal electrical wire hanging device of claim 14, wherein the mounting means comprises a side leg, the side leg having a upper end and a lower end planarly located opposite of each other, the lower end being positioned below the upper end, the upper end having a looped terminal, the looped terminal adjacently positioned to a vertical surface for attaching the side leg to the vertical surface, the looped terminal having an inner diameter not exceeding 0.265 inches.

16. The universal electrical wire hanging device of claim 15, wherein the distancing means comprises an extension leg, the extension leg having an first end and a second end planarly located opposite of each other, the first end being joined relatively perpendicular to the lower end of the side leg, the extension leg outwardly extending away from the lower end to define a clearance distance from the vertical surface.

17. The universal electrical wire hanging device of claim 16, wherein the receiving means comprises a looped wire receiving leg, the looped wire receiving leg being joined to the second end of the extension leg, the loop wire receiving leg joined to the second end by a terminal end, the terminal end configured in a spaced relation to an opposite end of the looped wire receiving leg leaving a gap of sufficient width for receiving an electrical wire for supporting engagement by the looped wire receiving leg, the looped wire receiving leg having a diameter, the diameter not exceeding four inches for supporting at least one electrical wire for use beyond the clearance distance from the vertical surface.

18. The universal electrical wire hanging device of claim 17, wherein the fastening means comprises a fastener, the fastener weldably attached to the side of the looped terminal for fastening the looped terminal to the vertical surface.

19. The universal electrical wire hanging device of claim 18, wherein the fastener comprises a driving pin, the driving pin mounted through a plate welded to the side of the looped terminal.

20. The universal electrical hanging device of claim 14, wherein each leg is formed of an elongated piece of rigid wire for supporting the electrical wire.

21. A universal electrical wire hanging device for hanging an electrical wire in a position for use when attaching to a surface comprising:

mounting means for mounting a mounting member formed of an elongated rigid piece of wire to a surface;

distancing means connected about a right angular relation to the mounting means, the distancing means extending away from the surface for distancing the mounting means from the surface;

receiving means joined to the distancing means for receiving and supporting at least one electrical wire;

fastening means joined to the mounting means for fastening the mounting member to the surface, wherein the mounting means comprises an upper leg having a first end and a second end where a looped terminal is planarly joined at the first end, the looped terminal positioned flush underneath the surface for attaching the upper leg to the surface, the looped terminal having an inner diameter, the inner diameter not exceeding 0.265 inches for defining the mounting member therein for the fastening means.

22. The universal electrical wire hanging device of claim 21, wherein the distancing means comprises an upright leg, the upright leg having an upper end and a lower end, the upper end joined relatively perpendicular to the second end of the upper leg, the upright leg extending away from the second end to define a clearance distance from the surface.

23. The universal electrical wire hanging device of claim 22, wherein the receiving means comprises a looped wire receiving portion, the loop wired receiving portion is serpentinely joined to the lower end of the upright leg, the loop wire receiving portion being joined to the lower end by a terminal end, the terminal end spaced in relation to an opposite end of the looped wire receiving portion leaving a gap of sufficient width for receiving an electrical wire for supporting engagement by the looped wire receiving portion, the looped wire receiving portion having a diameter, the diameter not exceeding four inches for supporting at least one electrical wire beyond the clearance distance from the surface.

24. The universal electrical wire hanging device of claim 23, wherein the fastening means comprises a fastener, the fastener weldably attached underneath to the looped terminal for fastening the looped terminal end to the ceiling surface, the fastener comprising of a driving pin, the driving pin mounted through a plate welded to the bottom of the looped terminal.

* * * * *